United States Patent
Matsukawa et al.

(10) Patent No.: US 8,929,547 B2
(45) Date of Patent: Jan. 6, 2015

(54) CONTENT DATA REPRODUCTION SYSTEM AND COLLECTION SYSTEM OF USE HISTORY THEREOF

(75) Inventors: Shinichi Matsukawa, Tokyo (JP); Akira Miura, Sagamihara (JP); Hiroshi Suu, Chigasaki (JP); Hiroyuki Sakamoto, Ome (JP); Akihiro Kasahara, Sambu-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 210 days.

(21) Appl. No.: 13/423,499

(22) Filed: Mar. 19, 2012

(65) Prior Publication Data

US 2012/0243684 A1 Sep. 27, 2012

(30) Foreign Application Priority Data

Mar. 23, 2011 (JP) ................ 2011-064928

(51) Int. Cl.
- *H04L 29/06* (2006.01)
- *H04L 9/08* (2006.01)
- *G06F 21/78* (2013.01)
- *G06F 21/10* (2013.01)

(52) U.S. Cl.
CPC ........... *G06F 21/10* (2013.01); *H04L 2463/062* (2013.01); *H04L 63/061* (2013.01); *H04L 9/0866* (2013.01); *G06F 2221/2107* (2013.01); *H04L 63/0435* (2013.01); *G06F 2221/2129* (2013.01); *G06F 21/78* (2013.01); *H04L 2209/60* (2013.01)
USPC .......................................... 380/255; 713/189

(58) Field of Classification Search
CPC ................................ G06F 21/10; G06F 21/78
USPC .......................................... 713/189; 380/255
See application file for complete search history.

(56) References Cited

U.S. PATENT DOCUMENTS

| | | | |
|---|---|---|---|
| 2005/0154905 A1* | 7/2005 | Kojima et al. | 713/193 |
| 2008/0040814 A1* | 2/2008 | Kasahara et al. | 726/28 |
| 2008/0268313 A1 | 10/2008 | Hirayama | |

FOREIGN PATENT DOCUMENTS

| | | |
|---|---|---|
| CN | 101282326 A | 10/2008 |
| CN | 101763469 A | 6/2010 |
| JP | 2005-341156 | 12/2005 |
| WO | WO 2010/119549 A1 | 10/2010 |

OTHER PUBLICATIONS

"Content Protection for Recordable Media Specification SD Memory Card Book Common Part", Intel Corporation International Business Machines Corporation Panasonic Corporation Toshiba Corporation, Revision 0.97, Dec. 15, 2010, 39 pages.

(Continued)

*Primary Examiner* — Hadi Armouche
*Assistant Examiner* — Dao Ho
(74) *Attorney, Agent, or Firm* — Oblon, Spivak, McClelland, Maier & Neustadt, L.L.P.

(57) ABSTRACT

According to one embodiment, a content data reproduction system includes a host device which uses content data, and a storage device configured such that content data, which is obtained by decrypting encrypted content data that is created by encrypting the content data by content key data, is made usable in the host device. The host device includes a device ID which is uniquely allocated to each of host devices. The storage device includes a memory and a controller configured to control the memory.

6 Claims, 9 Drawing Sheets

(56) References Cited

OTHER PUBLICATIONS

"Content Protection for eXtended Media Specification Introduction and Common Cryptographic Elements", Intel Corporation International Business Machines Corporation Panasonic Corporation Toshiba Corporation, Revision 0.85 Preliminary Release, Sep. 27, 2010, 31 pages.

Chinese Office Action issued May 20, 2014, in China Patent Application No. 201210031350.5 (with English translation).

Office Action issued Jul. 4, 2014 in Taiwanese Patent Application No. 101104454 (with English Translation).

* cited by examiner

F I G. 1

Index data table (First embodiment)

| Index | Data |
|---|---|
| 1—10 | 01 |
| 11—30 | 02 |
| 31—60 | 03 |
| ... | ... |
| | |

F I G. 2

F I G. 3

Structure example of use history 31a (Second embodiment)

| Card ID | 000010FE |
|---|---|
| Device ID of accessed device | 00010A11 |
| | 00010A11 |
| | 0001FF15 |
| | 00A90055 |
| | ⋮ |

Extended Verify Media Key Record (MK2)

| | |
|---|---|
| MK21 — | Record Type |
| MK22 — | Record Length |
| MK23 — | Verification Data #1 |
| | ⋮ |
| MK24 — | Verification Data #i |
| | ⋮ |
| MK25 — | Verification Data #n |

Verification Data #i = AES_E(Km #i, 0123456789ABCDEF$_{16}$ ‖ xxxxxxxxxxxxxxxx$_{16}$)

F I G. 9

Extended Media Key Data record (MK5)

| | |
|---|---|
| MK51 — | Record Type |
| MK52 — | Record Length |
| MK53 — | AES_ECBC(Processing Key #1, Km #1 ‖ Kuv #1) |
| | ⋮ |
| MK54 — | AES_ECBC(Processing Key #i, Km #i ‖ Kuv #i) |
| | ⋮ |
| MK55 — | AES_ECBC(Processing Key #n, Km #n ‖ Kuv #n) |

F I G. 10

F I G. 1 1

US 8,929,547 B2

CONTENT DATA REPRODUCTION SYSTEM AND COLLECTION SYSTEM OF USE HISTORY THEREOF

CROSS-REFERENCE TO RELATED APPLICATIONS

This application is based upon and claims the benefit of priority from prior Japanese Patent Application No. 2011-064928, filed Mar. 23, 2011, the entire contents of which are incorporated herein by reference.

FIELD

Embodiments described herein relate generally to a content data reproduction system and a collection system of a use history thereof.

BACKGROUND

In recent years, with the development of the information-oriented society, wide use has been made of a content data reproduction system which distributes computerized content data of books, newspapers, music or video to user terminals, thereby making such content data accessible.

DETAILED DESCRIPTION

In general, according to one embodiment, a content data reproduction system includes a host device which uses content data, and a storage device configured such that content data, which is obtained by decrypting encrypted content data that is created by encrypting the content data by content key data, is made usable in the host device. The host device includes a device ID which is uniquely allocated to each of host devices, and the storage device includes a memory and a controller configured to control the memory. The controller includes an encryption key generation module configured to create an encryption key from an element in a message, which is received from the host device, and the device ID; and an encryption module configured to encrypt an element in a message, which is to be transmitted, by the encryption key, thereby creating an encrypted message.

Since computerized content (hereinafter referred to simply as "content") can easily be copied, an unlawful conduct, which ignores copyrights, tends to easily occur. From the standpoint of protection of content from such an unlawful conduct, content is usually encrypted by an encryption key and then recorded. At a time of reproduction, the encrypted content is decrypted. An example of this kind of content protection technology is CPRM (Content Protection for Pre-recorded Media).

In addition, an encryption double-key method, in which a content key is doubly encrypted by two kinds of keys, has been thought. This kind of encryption double-key method is used, for example, in MQbic (trademark). Of the encryption keys, a key unique to recording media, for example, a media unique key, is securely stored in a hidden area of a storage medium and cannot be accessed from outside. Thus, for example, even if only encrypted content key data is unlawfully copied, the unlawful copier cannot use content data unless he/she has the media unique key.

However, if such a media unique key is unlawfully read out by some method and handed to a host manufacturer who has no regular license, it is possible that the content data is unlawfully used by an unlawful device which was manufactured based on such leaked information.

Embodiments will now be described with reference to the accompanying drawings. In the description below, common parts are denoted by like reference numerals throughout the drawings.

First Embodiment

A content data reproduction system according to a first embodiment is described.

<1. Structure Example>

1-1. Entire Structure

Figure 1:
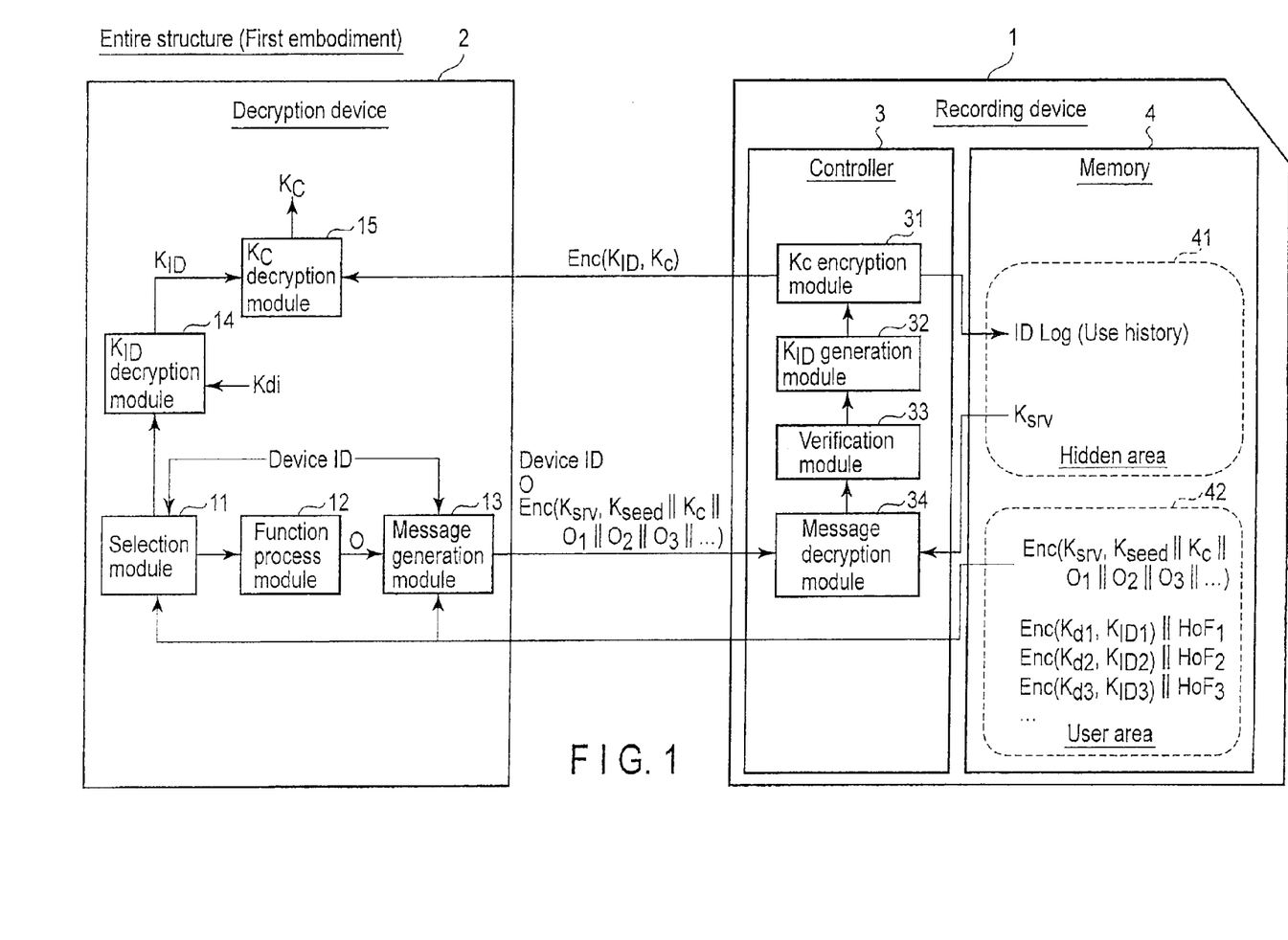
FIG. 1 is a block diagram showing a content data reproduction system according to a first embodiment.

To begin with, referring to FIG. 1, an entire structure (content data reproduction system) according to the first embodiment is described.

As shown in FIG. 1, the content data reproduction system of the first embodiment includes a decryption device 2 serving as a host device, and a storage device 1.

The decryption device 2 is the host device of the storage device 1 which uses content data. In other words, the decryption device executes an authentication process (to be described later) in cooperation with the storage device 1, and then acquires a content key. The decryption device 2 can decrypt and reproduce the content data by using the acquired content key.

The storage device 1 stores encrypted content data which is created by encrypting content data by a content key. The storage device 1 is configured such that content data, which is obtained by decrypting the encrypted content data, can be used in the decryption device 2. In other words, the storage device 1 stores the content key for encrypting content data. For example, a memory card, such as an SD (trademark) card, is used as the storage device 1.

To be more specific, the storage device (memory card) 1 includes a controller 3 and a memory 4. The controller 3 includes a Kc encryption module 31, $K_{ID}$ generation module 32, a verification module 33, and a message decryption module 34. The memory 4 includes a hidden area 41 which is inaccessible by anywhere other than the controller 3, that is, inaccessible from the outside of the storage device 1, and a user area 42 which is freely accessible from the outside of the storage device 1 via the controller 3.

In the user area 42, Enc(Ksrv, Kseed||Kc||O1||O2||O3|| . . . ), and Enc (Kd1, $K_{ID1}$)||HoF1||Enc (Kd2, $K_{ID2}$)||HoF2||Enc (Kd3, $K_{ID3}$)||HoF3 . . . , are recorded. In the hidden area 41, a service key Ksrv is recorded. In FIG. 1, || means concatenation of data.

The decryption device 2 includes a selection module 11, a function process module 12, a message generation module 13, a $K_{ID}$ decryption module 14, and a Kc decryption module 15.

The decryption device 2 holds, in the inside, a device ID (Device ID) and a device key Kdi, which are uniquely allocated to each decryption device 2.

The decryption device 2 reads out data, which is recorded in the user area 42, via the controller 3. Based on the device ID which is held by the decryption device 2, the selection module 11 selects Enc (Kdi, $K_{IDi}$) and HoFi, from among the read-out Enc (Kd1, $K_{ID1}$)||HoF1||Enc (Kd2, $K_{ID2}$)||HoF2||Enc (Kd3, $K_{ID3}$)||HoF3 . . . .

The selected Hofi is processed by the function process module 12, and an output O is calculated. Then, the message generation module 13 generates a message including the output O, Device ID, and Enc(Ksrv, Kseed||Kc||O1||O2||O3|| . . . ), and delivers the message to the controller 3 of the recording device 1. In this manner, in this example, the element "Kseed" is added in the message Enc(Ksrv, Kseed||Kc||O1||O2 ||O3|| . . . ).

The message decryption module 34 reads out the service key Ksrv which is recorded in the hidden area 41, and decodes Enc(Ksrv, Kseed||Kc||O1||O2||O3|| . . . ) in the received message, thus obtaining Kseed||Kc||O1||O2||O3|| . . . .

Subsequently, the verification module 33 executes verification by comparing O1, which is selected from O1, O2, O3 . . . , by the device ID, and the output O included in the message. If Oi and O are not identical, the process is stopped.

If Oi and O are identical, the $K_{ID}$ generation module 32 creates $K_{IDi}$ (encryption key) from the element Kseed in the message and the device ID which is uniquely allocated to each decryption device 2.

Then, the Kc encryption module 31 encrypts the content key Kc by the encryption key $K_{IDi}$, and creates an encrypted message Enc ($K_{ID}$, Kc). The encrypted message Enc ($K_{ID}$, Kc) is decrypted by the decryption device 2 and is read out.

At this time, the Kc encryption module 31 in the controller 3 writes the device ID, which is uniquely allocated to each decryption device 2 that is used, in the hidden area 41 as a use history. This use history will be read later by an exclusive command via the controller 3, and can be used for information collection of the device ID which is associated with access. When a copied unlawful decryption device, for example, was used, the same device ID is discovered from plural locations, and thus the unlawful device can advantageously be detected. The details will be described later.

In the decryption device 2, the selected Enc (Kdi, $K_{IDi}$) is decrypted by Kdi by the $K_{ID}$ decryption module 14, and $K_{IDi}$ is calculated. This result and the Enc ($K_{IDi}$, Kc), which has been received from the card, are decrypted by the Kc decryption module 15, and content key Kc is obtained. This content key Kc is used, for example, for decryption of corresponding content which is distributed through, e.g. some other distribution path.

A method of selecting a plurality of data from the device ID (Device ID) will now be described. Various methods of implementation are thinkable. For example, when the device ID is a value from 1 to 1000 and the plural data 1 to 1000 are given, it is possible to select data corresponding to the number of the device ID as counted from the beginning.

1-2. Structure Example of Index Table

Figure 2:
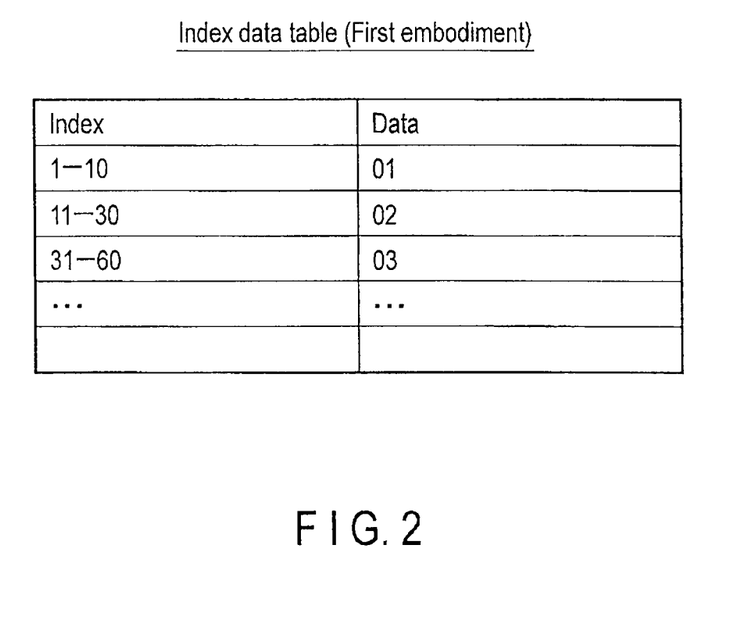
FIG. 2 is a block diagram showing an index data table relating to the first embodiment.

Next, referring to FIG. 2, a description is given of a structure example of an index table according to the first embodiment.

In this index table, a plurality of data, which are to be selected, become targets, and it is possible to select data according to the index table.

In addition, the same advantageous effect can be obtained by using DeviceKeySet, DeviceNode, and MKB described in Chapter 3 of reference document 2, in place of Kdi, Device ID and plural data, respectively.

Hof, which is processed in the function process module, can be realized by, for instance, a binary code of a program which can be interpreted by the function process module, or by an instruction. Alternatively, a function, which is predetermined in the function process module, may be prepared, and a function can be executed by using Hof as an input value. By determining, within the recording device, whether the result obtained by the decryption device is correct or not, a process by an unlawful decryption device can advantageously be prevented.

<3. Advantageous Effects>

According to the content data reproduction system relating to the first embodiment, at least the following advantageous effects (1) and (2) can be obtained.

(1) Unlawful use of content data can advantageously be prevented.

As has been described above, the content data reproduction system according to the first embodiment includes the device ID (Device ID) which is uniquely allocated to each decryption device (host device) 2. In the storage device 1 side, the $K_{ID}$ generation module 32 creates the $K_{IDi}$ (encryption key) from the element Kseed in the message, which is received from the decryption device 2, and the device ID of the decryption device. The Kc encryption module 31 encrypts the element Kc by the encryption key $K_{IDi}$ and creates the encrypted message Enc ($K_{ID}$, Kc). The encrypted message Enc ($K_{ID}$, Kc) is decrypted by the decryption device 2 and is read out.

In this manner, in the present system, content data is reproduced by the message Enc ($K_{ID}$, Kc) which is encrypted by the device ID (Device ID) which is uniquely allocated to each decryption device (host device) 2. As a result, unlawful use of content data can advantageously be prevented.

(2) An unlawful device can be excluded from the system, and the unlawful device can advantageously be detected.

Furthermore, the Kc encryption module 31 in the controller 3 writes the device ID, which is uniquely allocated to each decryption device 2 that is used, in the hidden area 41 as a use history. This use history will be read later by an exclusive command via the controller 3, and can be used for information collection of the Device ID associated with access. Specifically, the same device ID is discovered from plural locations, for example, from unlawfully copied devices.

As a result, the device having the discovered device ID can be regarded as an unlawful device, and this device can be excluded from the system, and the unlawful device can advantageously be detected.

A concrete example of information collection of the device ID associated with access is described in detail in a second embodiment which is described below.

Second Embodiment

An Example of Information Collection of Use History Associated with Access

Next, a description is given of a collection system of a use history of a content data reproduction system according to a second embodiment. This embodiment relates to an example of information collection of a use history associated with access. A detailed description of parts common to those in the first embodiment is omitted.

<Collection System of Use History>

Figure 3:
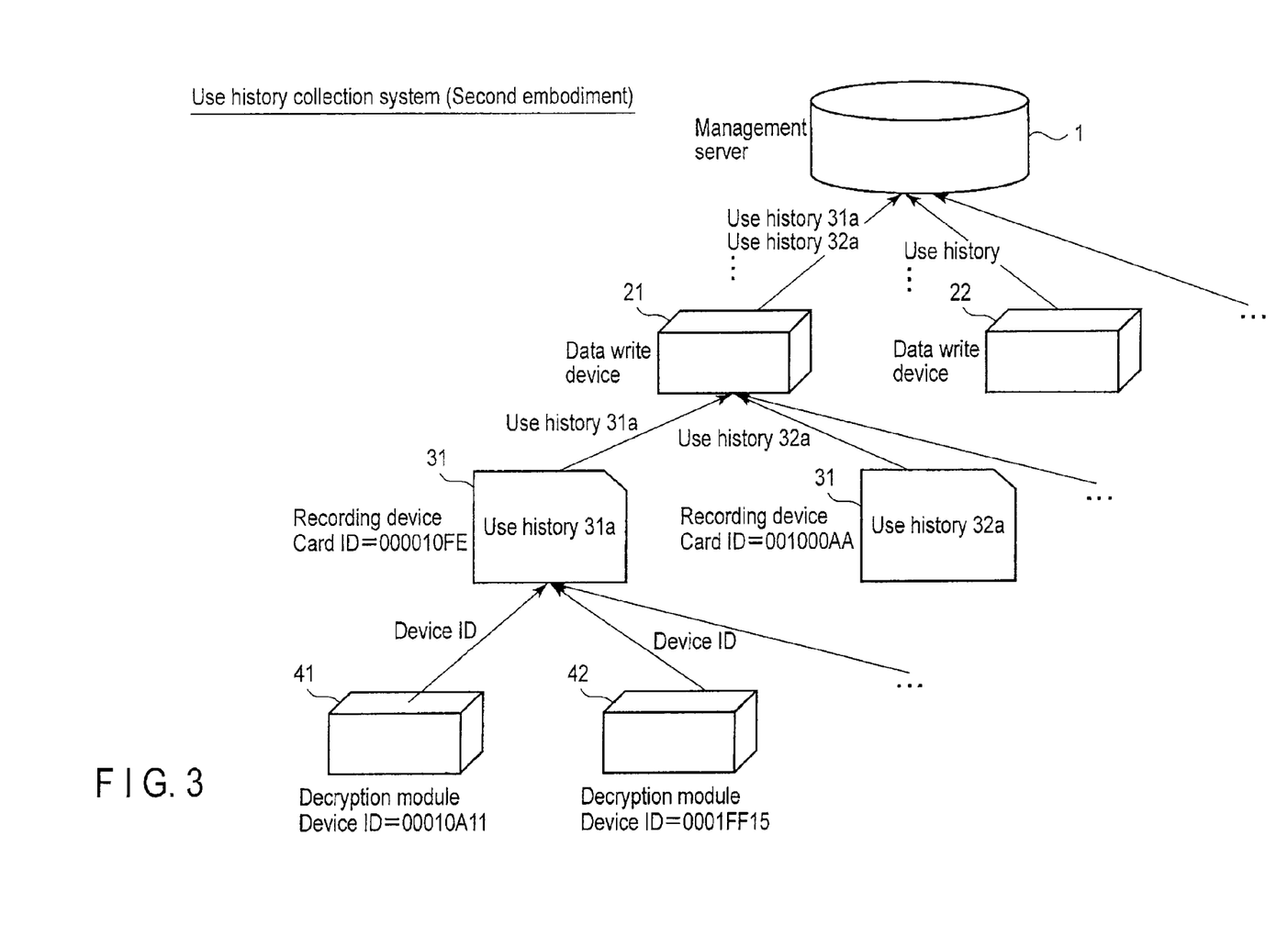
FIG. 3 is a block diagram showing a use history collection system of a content data reproduction system according to a second embodiment.

Referring to FIG. 3, a description is given of a concrete structure for collecting a use history (ID Log) which is recorded in a recording device 31 relating to the second embodiment.

As shown in FIG. 3, the use history collection system in this example includes a management server 1, data write devices 21, 22, . . . , recording devices 31, 32, . . . , and decryption devices 41, 42, . . . .

The decryption device (41, 42, . . . ) is a host device of a storage device, which delivers its own device ID to the recording device (31, 32, . . . ) at a time of accessing the recording device (31, 32, . . . ).

The recording device (31, 32, . . . ) records the device ID as a use history (31a, 32s, . . . ). The use history (31a, 32a, . . . ) is composed of a card ID (Card ID), which is uniquely allocated to each recording device (31, 32, . . . ), and a device ID (Device ID) which is associated with access.

Then, the use history (31a, 32a, . . . ) is read in, when the data write device (21, 22, . . . ) accesses the recording device (31, 32, . . . ).

Subsequently, the data write device (21, 22, . . . ) transmits the read-in use history (31a, 32a, . . . ) to the management server 1.

<Re: Structure Example of Use History>

Figure 4:
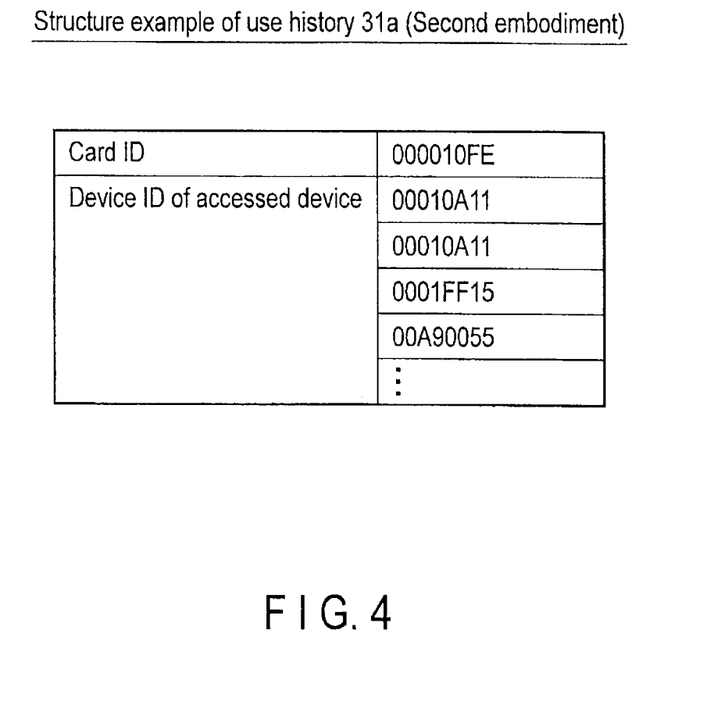
FIG. 4 shows a use history of the content data reproduction system according to the second embodiment.

FIG. 4 shows a structure example of the use history. A use history 31a of the recording device 31 is described by way of example.

As shown in FIG. 4, the use history 31a is composed of Card ID (000010FE), which is uniquely allocated to the recording device 31, and Device ID (00010A11, 00010A11, 0001FF15, 00A90055, . . . ) associated with access.

As described above, in this example, it is understood that the identical Device ID (00010A11, 00010A11) associated with access is discovered in the use history.

In this manner, the use history is collected by the management server 1. Thereby, when the identical Device ID (e.g. 00010A11, 00010A11, . . . ) has been discovered from plural recording devices (31, 32, . . . ), an unlawfully copied device can be determined. As a result, the device having the Device ID (e.g. 00010A11) can be excluded from the content data reproduction system, and unlawful use of content data can be prevented.

<Advantageous Effects>

As has been described above, according to the content data reproduction system of the second embodiment and the use history collection system thereof, at least the same advantageous effects (1) and (2) as described above can be obtained.

Furthermore, according to the present embodiment, by more concretely using the above-described use history and the collection system of the use history, an unlawful device can be excluded, where necessary, from the content data reproduction system, and the unlawful use of content data can be prevented.

Third Embodiment

Next, a content data reproduction system according to a third embodiment is described. This embodiment relates to an example of application to other embodiments. A detailed description of parts common to those in the first embodiment is omitted.

The third embodiment relates to, for example, an embodiment which is developed from an embodiment of patent document 2.

<Entire Structure>

Figure 5:
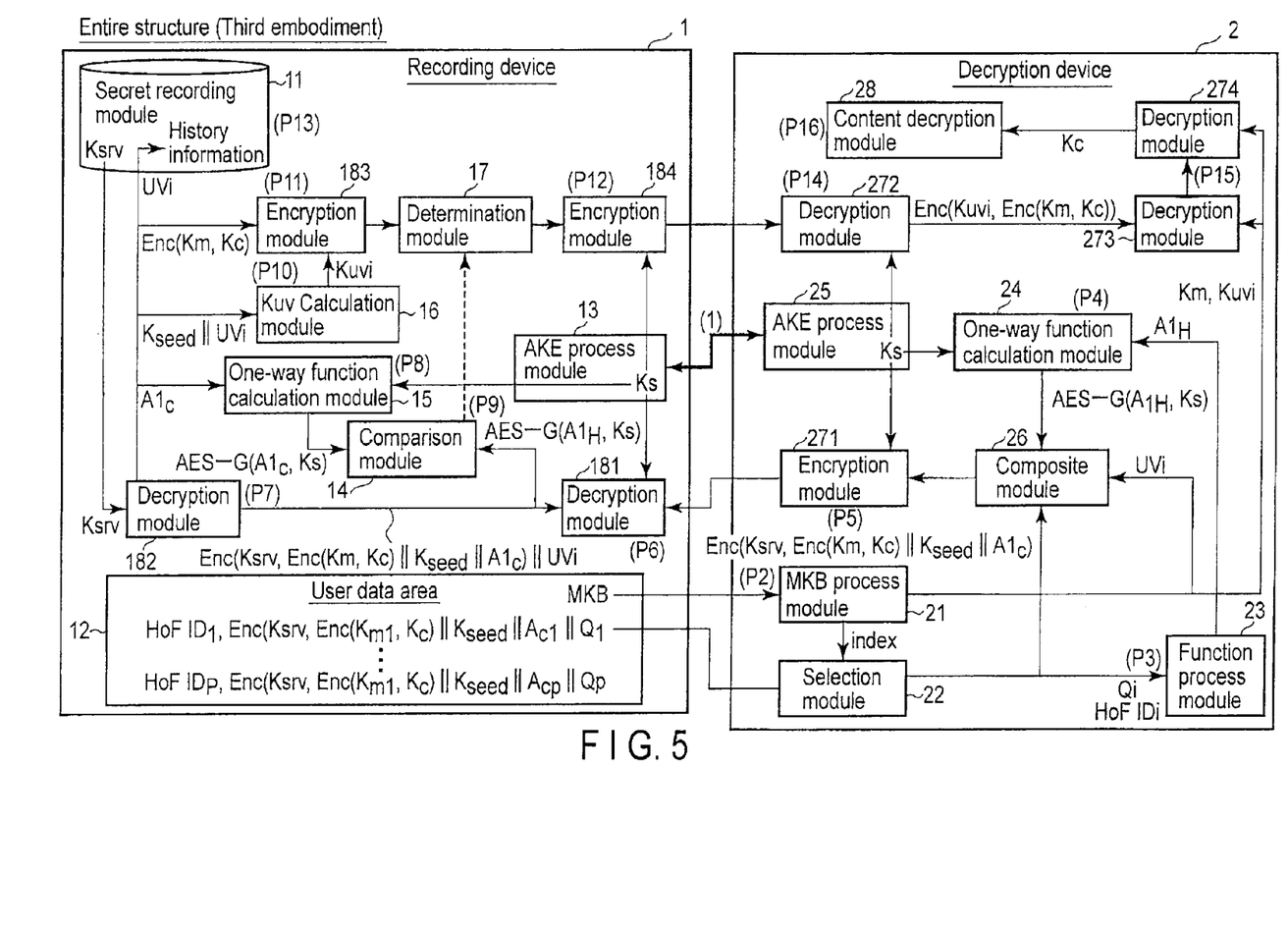
FIG. 5 is a block diagram showing a content data reproduction system according to a third embodiment.

To begin with, referring to FIG. 5, an entire structure (content data reproduction system) according to the third embodiment is described.

As shown in FIG. 5, the system of this embodiment is composed of a recording device 1 and a decryption device 2.

The recording device 1 includes a secret recording module 11, a user data area 12, an AKE process module 13, a comparison module 14, a one-way function calculation module 15, a Kuv calculation module 16, a determination module 17, a decryption module 181, a decryption module 182, an encryption module 183, and an encryption module 184, these components executing a process which will be described below.

The decryption device 2 includes an MKB process module 21, a selection module 22, a function process module 23, a one-way function calculation module 24, an AKE process module 25, a composite module 26, an encryption module 271, a decryption module 272, a decryption module 273, a decryption module 274, and a content decryption module 28, these components executing the process described below.

<Process Procedure>

Figure 6:
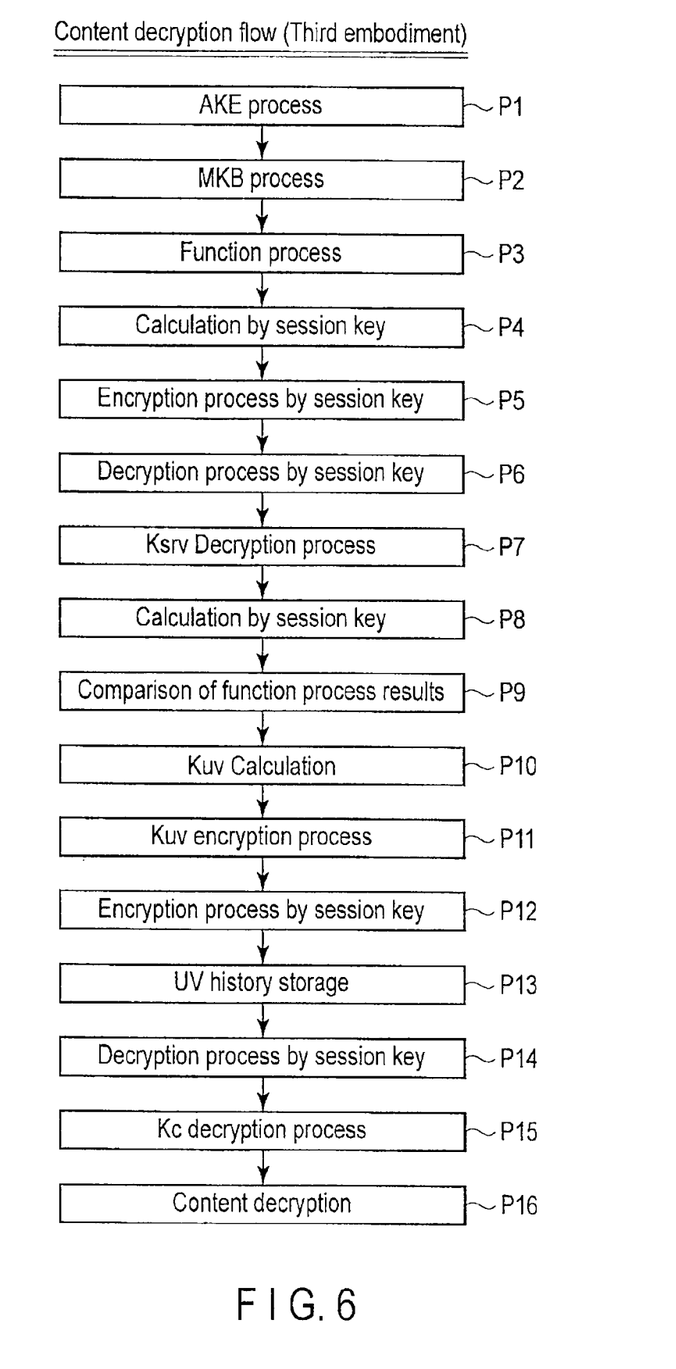
FIG. 6 is a flow chart illustrating a content decryption method of the content data reproduction system according to the third embodiment.

Next, referring to FIG. 6, the procedure of the process by the above-described system is described.

As shown in FIG. 6, the process relating to the third embodiment includes (P1) AKE process, (P2) MKB process, (P3) Function process, (P4) Calculation by session key, (25) Encryption process by session key, (P6) Decryption process by session key, (P7) Ksrv decryption process, (P8) Calculation by session key, (P9) Comparison of function process results, (P10) Kuv calculation, (P11) Kuv encryption process, (P12) Encryption process by session key, (P13) UV history storage, (P14) Decryption process by session key, (P15) Kc decryption process, and (P16) Content decryption.

(Step P1)

To start with, the decryption device 2 and recording device 1 execute an authentication process via their AKE process modules 25 and 13, and share a common session key (Ks). This authentication process can be realized by, for example, AKE Process.

(Step P2)

Then, the MKB process is executed. The decryption device 2 reads out an MKB which is recorded in the user area 12 of the recording device 1. The MKB process module 21 executes the MKB process and extracts index, UVi, Km and Kuvi. According to the extracted index, the selection module 22 selects corresponding data entry HoF IDi, Enc (Ksrv, Enc (Kmi, Kc)∥Kseed∥Ai)∥Qi, from the data which is read out from the user data area 12.

Specifically, the MKB process can be realized, for example, by executing a process of FIG. 7, which is to be described below, with respect to MKB (Media Key Block) shown in FIG. 8.

<Structure of MKB (Media Key Block)>

Figure 8:
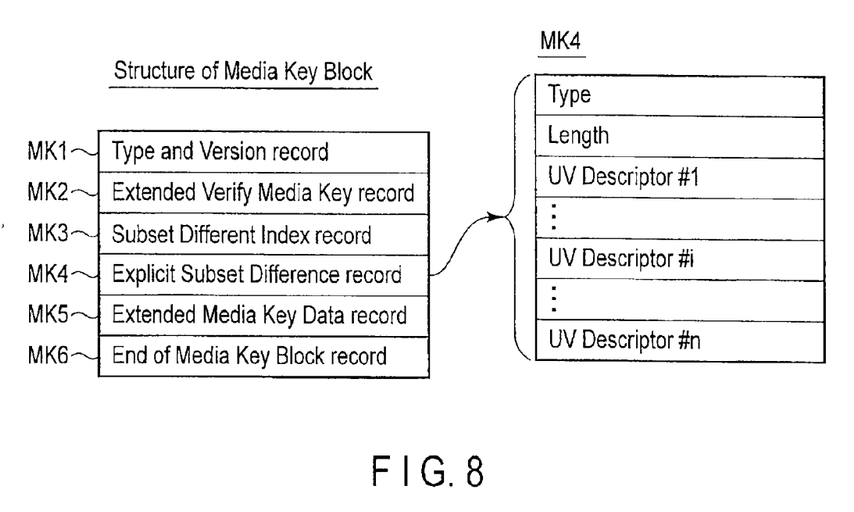
FIG. 8 shows a structure of an MKB (Media Key Block) relating to the third embodiment.

The structure of the MKB (Media Key Block) shown in FIG. 8 is described.

As shown in FIG. 8, the MKB of this example includes Type and Version record (MK1), Extended Verify Media Key record (MK2), Subset Different index record (MK3), Explicit Subset Difference record (MK4), Extended Media Key Data record (MK5), and End of Media Key Block record (MK6).

As described above, Verify Media Key record is extended and changed to Extended Verify Media Key record (MK2), and Media Key Block (Data) record is extended and changed to Extended Media Key Block (Data) record (MK5).

In addition, Explicit Subset Difference record (MK4) is composed of Type, Length, UV Descriptor #1, . . . , UV Descriptor #i, . . . , UV Descriptor #n.

<Structure of Extended Verify Media Key Record (MK2)>

Figure 9:
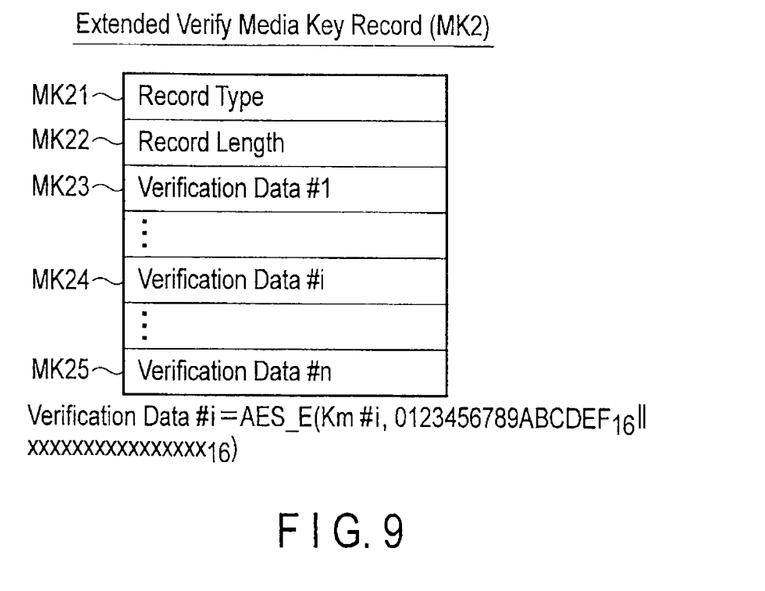
FIG. 9 shows a structure of an Extended Verify Key record in FIG. 8.

Referring to FIG. 9, the structure of the Extended Verify Media Key record (MK2) is described.

As shown in FIG. 9, the Extended Verify Media Key record (MK2) includes Record Type (MK21), Record Length (MK22), Verification Data #1 (MK23), . . . , Verification Data #i (MK24), . . . , Verification Data #n (MK25).

<Structure of Extended Media Key Data Record (MK5)>

Figure 10:
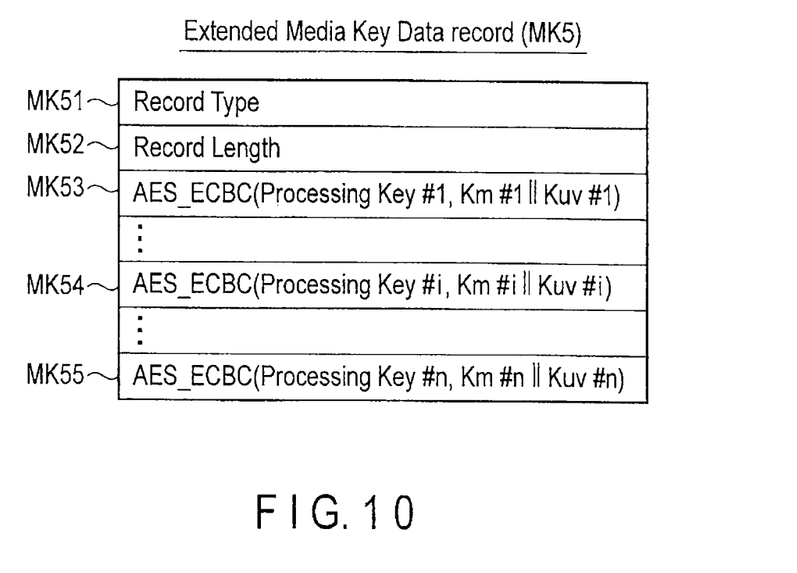
FIG. 10 shows a structure of an Extended Media Key Data record in FIG. 8.

Referring to FIG. 10, the structure of the Extended Media Key Data record (MK5) is described.

As shown in FIG. 10, the Extended Media Key Data record (MK5) includes Record Type (MK51), Record Length (MK52), AES_ECBC (Processing Key#1, Km#1||Kuv#1) (MK53), . . . , AES_ECBC (Processing Key#1, Km#i||Kuv#i) (MK54), . . . , AES_ECBC (Processing Key#1, Km#n||Kuv#n) (MK55). In FIG. 10, AES_ECBC is a function, i is a value which is greater than 1 and is less than n, and || indicates concatenation of data.

<Re: MKB Process>

Figure 7:
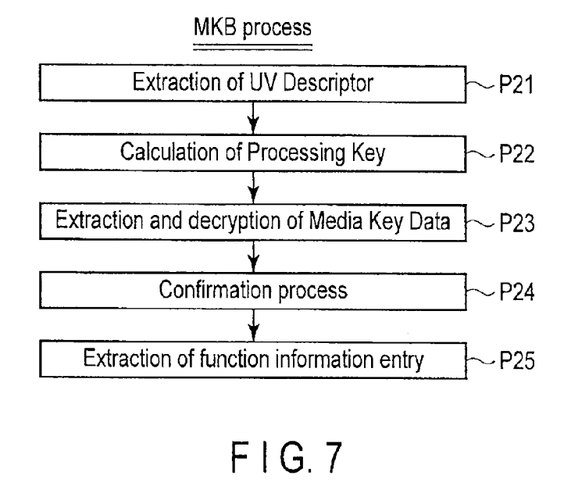
FIG. 7 is a flow chart illustrating an MKB process of the content data reproduction system according to the third embodiment.

Next, referring to FIG. 7, the MKB process is described.

(Step P21)

To start with, in the MKB process, in step S21, UV Descriptor, which is to be processed by the decryption device 2, is selected from the Explicit Subset Difference record (MK4). This UV Descriptor is described as UVi, and is used in a subsequent process.

(Step P22)

Then, a corresponding Processing Key is calculated from the selected UV Descriptor. In the description below, the calculated Processing Key is expressed as Processing Key#i.

(Step P23)

Subsequently, Media Key Data is extracted from the Extended Media Key Block (Data) record (MK5). Specifically, the corresponding AES_ECBC (Processing Key#1, Km#i||Kuv#i) (AES_ECBC is a function, i is a value which is greater than 1 and is less than n, and || indicates concatenation of data) is extracted from the Extended Media Key Block record (MK5) described in FIG. 10.

Since the Media Key Data are arranged with the same numbers in the same order as the UV Descriptors, the decryption device 2 can find the corresponding Media Key Data. Then, a decryption procedure for the extracted Media Key Data is executed. Km#i and Kuv#i can be extracted by the decryption with Processing Key#i.

(Step P24)

Subsequently, a confirmation process is executed to determine whether the extracted Km#i is corrected in the Extended Verify Media Key record (MK2). As shown in FIG. 9, the Extended Verify Media Key record (MK2) in this example is composed of a plurality of Verification Data (MK23 to MK25), and is composed of data which is encrypted by a value in which Km0 is expressed as Km#1 to Km#n.

The decryption device 2 extracts and decrypts the corresponding Verification Data, thus being able to confirm whether Km#1, which is obtained when the data is decrypted, as described below, has been correctly extracted. The same number of Verification Data (MK23 to MK25), as the UV Descriptors, are arranged, and the Verification Data (MK23 to MK25) corresponding to a certain UV Descriptor, is arranged in the same order. Accordingly, the decryption device 2 can find the corresponding Verification Data (MK23 to MK25).

(Step P25)

Figure 11:
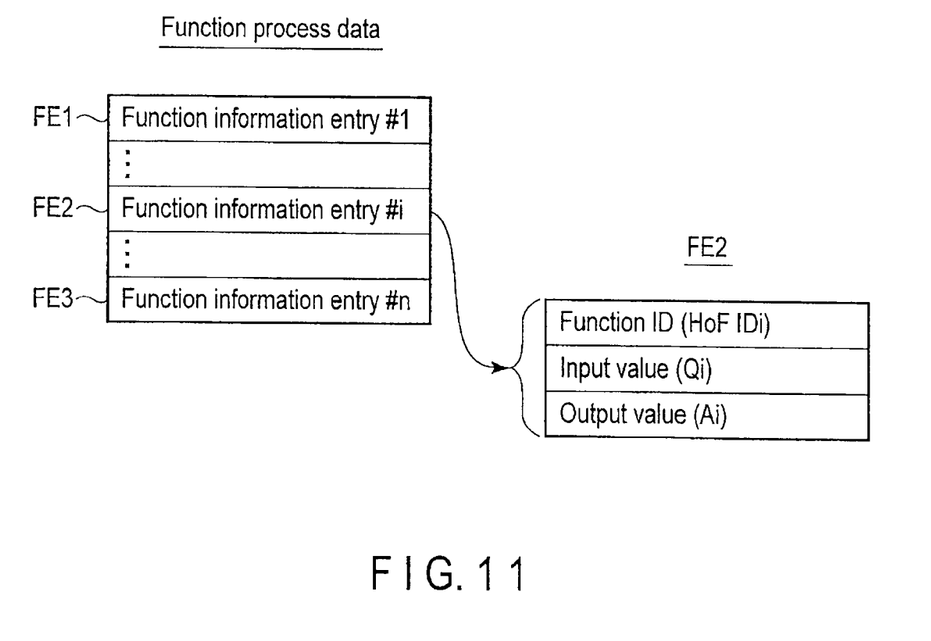
FIG. 11 shows function process data of the content data reproduction system according to the third embodiment.

Then, a corresponding function information entry (FE1 to FE3) is acquired from function process data shown in FIG. 11, which is written in the recording device 1. The function information entries (FE1 to FE3) are recorded with the same numbers (#1, . . . , #i, 3n), and the corresponding function information entry is recorded in the same order as the UV Descriptor. Thus, the corresponding function information entry can be found.

As shown in FIG. 11, for example, function information entry (FE2) is composed of a function ID (hereinafter described as "Hof IDi"), an input value (hereinafter "Qi"), and an output value (hereinafter "Ai").

The above-described MKB process is followed by step P3 which is described below.

(Step P3)

Next, in the function process, Qi, HoF and IDi are extracted from the data entry selected by the selection module 22, and the function process module 23 executes a function process. In the function process module, a function corresponding to HoF ID is recorded in advance, and if Qi is input as an input value to the function process module, an output Ai can be calculated. In order to distinguish this output Ai from Ai which is pre-recorded in the recording device, a result calculated by the decryption process module is described as AiH, and the recorded Ai is described as AiC.

(Step P4)

Subsequently, in the calculation by the session key, the AiH obtained by the function process module 23 is subjected to a calculation in the one-way function calculation module 24 with use of the Ks obtained by the AKE process module 25. This calculation is executed by AES-G ($Ai_H$, Ks), but the calculation is not limited to this example if the calculation formula has the property of the one-way function. In the meantime, AES-G (A, B) can be realized by AES_G that is described in reference document 2.

(Step P5)

Then, in the encryption process by the session key, the information that is to be transmitted to the recording device is encrypted. As regards the information that is to be transmitted, information pieces, UVi, AES-G ($Ai_H$, Ks), and Enc (Ksrv, Enc(Km, Kc)||$K_{seed}$||$Al_C$), which have been obtained by (P2) and (P4), are coupled and encrypted, and the resultant information is transmitted.

(Step P6)

Subsequently, in the recording device, the received information is subjected to a decryption process with use of the session key.

(Step P7)

Then, using a service key Ksrv which is present in the recording device, Enc (Ksrv, Enc(Km, Kc)||$K_{seed}$||$Al_C$)||UVi, which was obtained in the above step P6, is decrypted.

(Step P8)

Subsequently, AES-G ($Al_C$, Ks) is calculated by a calculation using $Al_C$ obtained in the above step P7 and the session key obtained in (P1).

(Step P9)

Then, it is verified whether the result of the above step P8 and AES-G ($Ai_H$, Ks) obtained in the above step P6 are the same value or not. If these are not the same value, a process is executed to regard the access as an access from an unlawful copied device is executed. For example, a subsequent process is not executed.

(Step P10)

Subsequently, Kuvi is calculated from $K_{seed}$ and UVi obtained in the above step P7. As regards the calculation method, for example, the calculation can be executed by the following equation (I):

$$Kuvi = AES\text{-}D(Kseed \text{ xor } UVi) \text{ xor } UVi \qquad (I)$$

(Step P11)

Then, an encryption process for Enc (Km, Kc) obtained in the above step P7 is executed by using Kuvi obtained in the above step P10.

(Step P12)

Subsequently, using the session key obtained in the above step P1, Enc (Kuvi, Enc (Km, Kc)) obtained in the above step P11 is encrypted and transmitted to the decryption device.

(Step P13)

Then, the recording device 1 stores UVi, which was obtained in the above step P7, in the secret recording module 11 as history information. The recorded history information will be read out later, for example, when the recording device 1 is connected to a purpose-specific terminal, and will be collected in the management server. The collection process can be realized, for example, by the same system as described in the second embodiment.

(Step P14)

Subsequently, the decryption device 2 executes a decryption process of the information received in the above step P13, for example, by the session key generated in the above step P1.

(Step P15)

Then, a decryption process of Enc (Kuvi, Enc (Km, Kc)), which was obtained in the above step P14, is executed by using Km and Kuvi obtained in the above step P2, thereby extracting the content key Kc.

(Step P16)

At last, content decryption is executed by using the content key Kc obtained in the above step P15.

<Advantageous Effects>

As has been described above, according to the content data reproduction system of the third embodiment, at least the same advantageous effects (1) and (2) as described above can be obtained.

Furthermore, according to the third embodiment, for example, as in step S11, the content key Kc is processed in the encrypted state in the recording device 1. Thus, the recording device 1 is unable to recognize the content key Kc itself, and the secrecy of information can be improved.

Where necessary, the structure of the present embodiment is applicable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content data reproduction system comprising:
    a host device which uses content data; and
    a storage device configured such that content data, which is obtained by decrypting encrypted content data that is created by encrypting the content data by content key data, is made usable in the host device,
    wherein the host device includes a device ID which is uniquely allocated to each of host devices,
    the storage device includes a memory and a controller configured to control the memory, the controller including:
    an encryption key generation module configured to create an encryption key from an element in a message, which is received from the host device, and the device ID; and
    an encryption module configured to encrypt an element in a message, which is to be transmitted, by the encryption key, thereby creating an encrypted message,
    the controller is configured to write the device ID, which has been used, in a hidden area in the memory as a use history, and
    the system is applied to a collection system of a use history, the collection system including a data write device configured to write the use history in the storage device at a time of accessing the storage device, and a management server to which the written use history is transmitted, and
    the management server determines, when an identical device ID to the device ID has been discovered in the use history that has been transmitted, that a host device corresponding to the device ID is an unlawful device.

2. The system of claim 1, wherein the controller further includes a message decryption module configured to obtain the element (Kseed) by decrypting a service key, which is read out of the memory, and the message which is received from the host device.

3. The system of claim 2, further comprising a verification module configured to verify an output of the message decryption module by the device ID.

4. A collection system of a use history, to which applied is a content data reproduction system including:
    a host device which uses content data;
    a storage device configured such that content data, which is obtained by decrypting encrypted content data that is created by encrypting the content data by content key data, is made usable in the host device;
    a data write device configured to write the use history in the storage device at a time of accessing the storage device and a management server to which the written use history is transmitted;
    wherein the host device includes a device ID which is uniquely allocated to each of host devices;
    the storage device includes a memory and a controller configured to control the memory, the controller being configured to write the device ID, which has been used, in a hidden area in the memory as a use history;
    an encryption key generation module configured to generate an encryption key from an element in a message, which is received from the host device, and the device ID;
    an encryption module configured to encrypt an element in a message, which is to be transmitted, by the encryption key, thereby creating an encrypted message; and
    the management server determines, when an identical device ID to the device ID has been discovered in the use history that has been transmitted, that a host device corresponding to the device ID is an unlawful device.

5. The system of claim 4, wherein the controller further includes a message decryption module configured to obtain the element (Kseed) by decrypting a service key, which is read out of the memory, and the message which is received from the host device.

6. The system of claim 5, further comprising a verification module configured to verify an output of the message decryption module by the device ID.

* * * * *